(12) United States Patent
Kimel

(10) Patent No.: US 6,551,464 B1
(45) Date of Patent: Apr. 22, 2003

(54) DISTILLATION/REFLUX EQUIPMENT

(76) Inventor: Howard Kimel, 5787 Kugler Mill Rd., Cincinnati, OH (US) 45236

( * ) Notice: Subject to any disclaimer, the term of this patent is extended or adjusted under 35 U.S.C. 154(b) by 0 days.

(21) Appl. No.: 09/505,806

(22) Filed: Feb. 17, 2000

(51) Int. Cl.[7] .............................. B01D 3/32; B01D 3/42; B01D 3/04
(52) U.S. Cl. ................... 202/153; 202/160; 202/161; 202/235; 202/237; 202/242; 202/266; 203/2; 203/100; 203/DIG. 2
(58) Field of Search ................... 202/161, 153, 202/162, 198, 160, 237, 242, 266, 235; 203/100, DIG. 2, 2; 422/101–103

(56) References Cited

U.S. PATENT DOCUMENTS

| | | | | |
|---|---|---|---|---|
| 2,538,957 A | * | 1/1951 | Askevold et al. | 202/161 |
| 2,701,789 A | * | 2/1955 | White | 202/161 |
| 3,012,949 A | * | 12/1961 | Mooney | 202/161 |
| 3,334,025 A | * | 8/1967 | Reid | 202/161 |
| 3,401,096 A | * | 9/1968 | Wondrak | 202/161 |
| 3,416,999 A | * | 12/1968 | Shepherd et al. | 202/161 |
| 3,607,662 A | * | 9/1971 | Glover | 202/160 |
| 4,238,451 A | * | 12/1980 | Ciais et al. | 202/161 |
| 4,528,162 A | * | 7/1985 | Goodwin et al. | 202/197 |
| 4,770,746 A | * | 9/1988 | Mayo et al. | 159/DIG. 16 |
| 5,217,904 A | * | 6/1993 | Bruno | 159/16.1 |
| 6,235,162 B1 | * | 5/2001 | Sharifian et al. | 203/74 |
| 6,419,796 B1 | * | 7/2002 | Kitamura et al. | 202/153 |

* cited by examiner

Primary Examiner—Virginia Manoharan
(74) Attorney, Agent, or Firm—Gipple & Hale

(57) ABSTRACT

A combination reflux/distillation apparatus is provided having interchangeable reflux and distillation columns, a segmented collection trough and an integrated indirect heating provision. The apparatus is uniquely adapted for refluxing and distilling small quantities of materials without the losses attendant to larger apparatus.

7 Claims, 2 Drawing Sheets

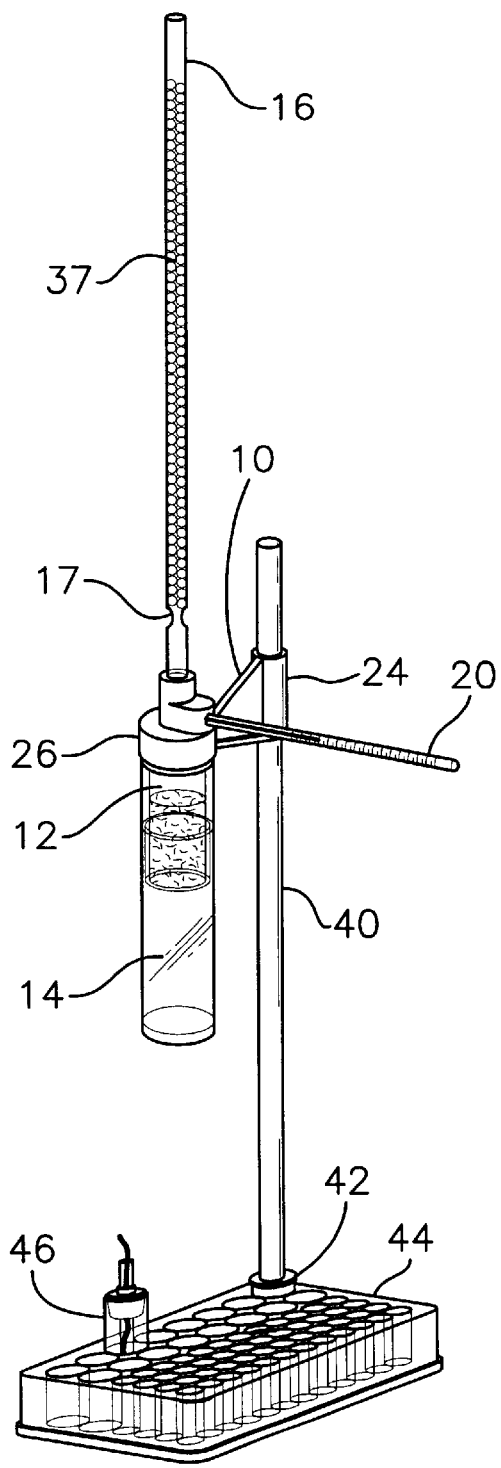
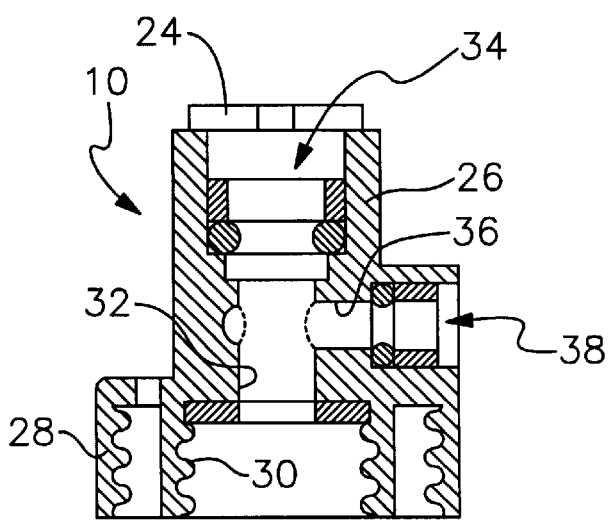
Fig. 1
Fig. 2

DISTILLATION/REFLUX EQUIPMENT

FIELD OF THE INVENTION

The present invention is a combination distillation/reflux apparatus that is portable, inexpensive and uniquely adapted for use with relatively small samples in the order of less than 5 ml.

BACKGROUND OF THE INVENTION

Many laboratory experiments require distillation and reflux processes. The conventional equipment for performing such processes includes Bunsen burners, retorts, reflux columns, receptacles, and support stands. The standard size of such equipment is appropriate to processing a quantity of liquid a quarter (¼) liter or more. Smaller quantities cannot be effectively distilled or refluxed in standard equipment. The liquid is boiled away and lost in the large container before it can effectively distill or reflux.

The time required to distill or reflux liquid diminishes with the quantity. So the time required to process a quarter liter, is proportionally greater than when the quantity is 2.0 ml. to 3.5 ml.

Standard distillation and reflux equipment is expensive and requires a stable laboratory installation. Because it is fragile and cumbersome, it is not easily portable.

Accordingly, there is a need for laboratory equipment which can process relatively small quantities of liquid (e.g. 2.0 ml. to 3.5 ml); and which is light weight, inexpensive, non-fragile, and easily portable. With such equipment, effective laboratory experiments can be carried out in circumstances that do not accommodate the installation of standard laboratory equipment such as classrooms or makeshift laboratories in remote places.

DESCRIPTION OF THE PRIOR ART

The prior art considered relevant to the present invention is the conventional laboratory equipment, such as Bunsen burners, retorts, reflux columns, receptacles and support stand presently used to perform experiments involving reflux and distillation. Applicant is not presently aware of any prior art that teaches the specific adaptation of equipment to process small quantities of liquid and provide the other advantages that the present invention offers.

SUMMARY OF THE INVENTION

The present invention is directed to a combination reflux and distillation column that includes a first vessel for holding a volatilizable liquid and a second larger vessel containing a heating medium. The first vessel is at least partially immersed in the heating medium, and both vessels have upper openings that engage with a cap that completes closure of the second vessel and provides a connecting passage between and an upward projecting tubular column. A support arm extends from the cap to maintain the column and both vessels in upright alignment. The upward projecting column can be interchangeable reflux and distillation columns.

In one embodiment, the cap is provided with a transverse orifice to accommodate a temperature sensing device.

In another embodiment, a segmented collection trough is provided at the open unconnected end of the distillation column to receive distillate fractions.

BRIEF DESCRIPTION OF THE DRAWINGS

FIG. 1 is a perspective view of the apparatus of the invention as used in conducting reflux procedures.

FIG. 2 is a sectioned front elevation of the distillation and refluxing arm of the apparatus of the invention.

DETAILED DESCRIPTION OF THE INVENTION

Figures 3, 4:
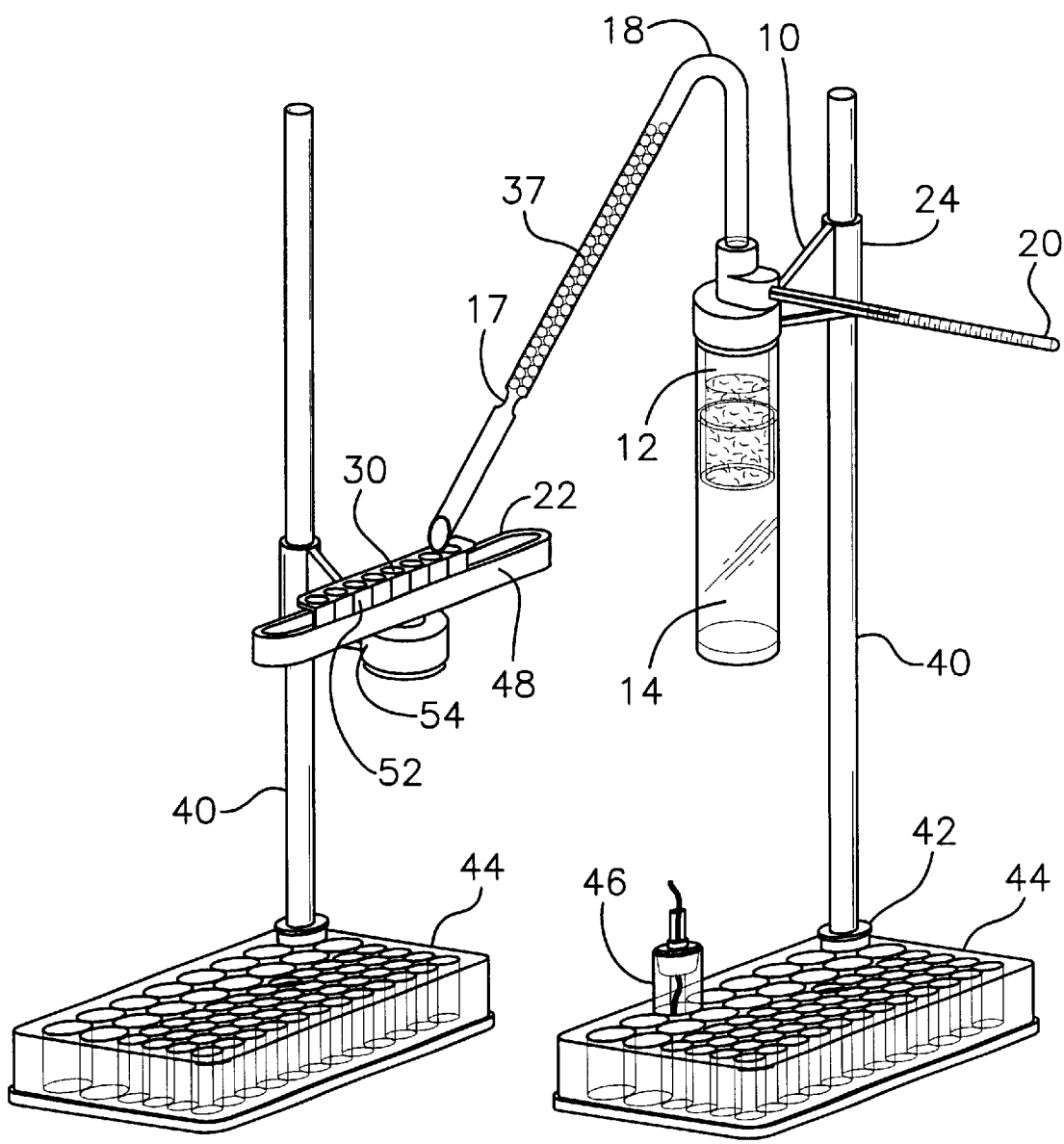
FIG. 3 is a perspective view of the apparatus for conducting distillation procedures.
FIG. 4 is a perspective view of a distillation fraction collector of the apparatus of the invention shown mounted on a retort stand.

The present invention is directed to laboratory distillation and refluxing apparatus that is light weight, inexpensive, non-fragile, easily portable, and capable of refluxing and distilling relatively small quantities (2.0 ml. to 3.5 ml.) of liquid.

The amount of heat necessary for any experiment may be generated by a small microburner.

The time required to reflux or distill is proportionately less than with conventional equipment, because small quantities of liquid can be processed.

The purity of the resulting products is high when compared to standard procedures with conventional equipment.

The invention will be more fully appreciated by having specific reference to the drawings which illustrate a preferred embodiment thereof.

Directing attention to the drawings, the laboratory reflux and distillation apparatus is shown consisting of a distillation and refluxing arm 10, a small capacity (1 dram) reaction vial 12, a larger capacity (8 dram) heating vessel 14, a refluxing column (as shown in FIG. 1), a distillation column 18 (as shown FIG. 3), a thermometer 20 and a distillation fraction collector 22 (as shown in FIG. 4).

The distillation and refluxing arm 10 is molded from a suitably resilient plastic material and includes at one end a split sleeve 24 and at its other end a body 26 in which the vials 12 and 14, the refluxing column 16, and the distillation column and the thermometer 20 are releasibly engageable in use.

The body portion 26 of the arm 10 of the apparatus is shown in FIG. 2 to include first and second concentrically arranged threaded caps 28 and 30, a first passage 32 which extends between the cap 30 and an open socket 34 at the upper end of the body and a second passage 36 which intersects the passage 32 and is open to a second socket on the side of the body as shown in the drawing. The refluxing column or tube 16 and distillation column 18 respectively are glass tubes which are partially filed with 3 mm glass beads 37 which collectively provide a large area cooling surface which condensation takes place in the columns in use. The reflux column is a linear tube, having a length of between 21.5 cm and 30.0 cm which, in use, is held vertically and the distillation column 18 is a similar arrangement which has its free end including cooling beads folded downwardly, as shown in FIG. 3, for distillate discharge. The distillation retort tube has a vertical length of about 6 cm to 6.5 cm and downwardly inclined length of 12 cm. The tubes 16 and 18 are pinched to form a constriction 17, which is small enough that the glass beads cannot pass through it.

The thermometer 20 is a conventional linear thermometer which ranges from 0° to 200° C.

In use in conducting refluxing experiments with the apparatus of the invention the apparatus is arranged as illustrated in FIG. 1 with the split sleeve 24 of the distillation and refluxing arm 10 being frictionally engaged over a retort stand 40 which carries on its lower end a rubber bung 42 which is engaged in a well of the base member 44. The reaction vial 12 filled with reagents suitable for whatever refluxing experiment is to be carried out with the apparatus and its screw threaded mouth is screwed into the cap 30 up against a resilient seal in the body 26 of the arm 10. The heating vessel 14 is partially filled with silicon oil, the boiling point of which is between 200° C. and 275° C., and the threaded mouth of the vessel is threadedly engaged with the cap 28 on the arm body 28 with the reagent in the vial 12 at least partially immersed in the oil in the vessel 14, as shown in FIG. 1. The bulb portion of the thermometer 20 is inserted into the body socket 38 and pressed through an O-ring at the mouth of the passage 36 to be situated in and across the body passage 32. The refluxing column 16 is similarly pressed into the vertical socket 34 and the O-ring situated in it to be sealingly supported in the socket. With the apparatus now in place a methylated spirits microburner 46 is located in a well of the base 44 beneath the heating vessel 14 and its wick is lit.

Refluxing occurs in a very gentle manner as the heated oil in the vessel 14 evenly heats the reagent in the vial 12. Refluxing may progress for time periods of anywhere from 5 to 30 minutes. The heat source is now removed and the system is permitted to cool at which time the refluxing column or tube 16 is removed.

The distillation column 18 is now attached, as shown in FIG. 3, to the upper end of the arm body 28 in the same manner used to locate the refluxing arm.

The fraction collector 22 consists of a trough 48 in which a strip 50 of connected micro-well (5 mm×10 mm) distillate collection vessels 52 are slidably located and which has a central downwardly dependent stud on its underside which is frictionally engageable in a bore in a retort stand arm 54. For distillation experiments the arm 54 together with the tray 48 is engaged with a retort stand 40 and base 44, as shown in FIG. 4. The height of the upper level of the micro-well strip 50 is adjusted, by moving the arm upwardly or downwardly on the stand 40, to be very slightly below the outlet lip of the distillation retort tube column and is positioned so that a selected collection vessel 52 is located beneath the lip of the distillation retort tube.

The microburner 46 is lit and the oil in the heating vessel 14 is heated to a temperature sufficient to initiate the distillation process. The thermometer 20 serves as an indicator for the separation of the mixture. As the temperature changes, this physical feature serves as an indicator of the vapors that are being boiled over as temperature is a significant parameter of purity. The distillate is collected in the collection vessels 52 of the fraction collector 22 in a manner convenient to the experiment.

Other modifications and alternatives to the herein described procedures and components will be apparent to those of ordinary skill in this art and are considered to fall within the scope of the claims defining this invention.

What is claimed is:

1. An interchangable reflux and distillation apparatus, comprising:

a vessel having an open, upper end for holding a volatilizible liquid;

a cap engaging with said upper end of the vessel for forming a connecting passage with the interior of the vessel and an elongated tubular column for receiving a volatilized compound of the liquid in said vessel, said elongated column being a member selected from a group consisting of a reflux column and a distillation column and said cap being provided with a transverse orifice that intersects said connecting passage for receiving temperature measurements means;

heating means for applying thermal energy to said vessel to volatilize at least a portion of said liquid in the vessel;

a horizontal support arm engaging with said cap and a vertical support member to maintain said cap, vessel and elongated column in aligned vertical position;

said heating means including a container holding a heating medium that engages with at least a portion of the vessel containing the volatizible liquid; and said container holding the heating medium also engaging with said cap.

2. The apparatus of claim 1 wherein the upper end of said vessel and an upper end of said container are both threaded to engage with respective threaded portions on said cap.

3. The apparatus of claim 1 wherein said elongated column is at least partially filled with glass beads.

4. The apparatus of claim 1 wherein said elongated column is provided with indentations over at least a portion of its length.

5. The apparatus of claim 1 wherein said reflux column is straight and said distillation column is bent at an acute angle.

6. The apparatus of claim 1 which further includes a segmented collection trough, disposed at the distal end of said distillation column to receive distillate fractions.

7. The apparatus of claim 1 wherein said temperature measurement means is a thermometer.

* * * * *